(12) United States Patent
Nelson

(10) Patent No.: US 8,977,702 B2
(45) Date of Patent: *Mar. 10, 2015

(54) SELECTING A MASTER NODE USING A SUITABILITY VALUE

(71) Applicant: VMware, Inc., Palo Alto, CA (US)

(72) Inventor: Michael Nelson, Alamo, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,898

(22) Filed: Oct. 14, 2013

(65) Prior Publication Data

US 2014/0040408 A1   Feb. 6, 2014

Related U.S. Application Data

(63) Continuation of application No. 13/006,132, filed on Jan. 13, 2011, now Pat. No. 8,560,626.

(51) Int. Cl.
| | |
|---|---|
| *H04L 12/24* | (2006.01) |
| *H04L 12/26* | (2006.01) |
| *H04L 29/08* | (2006.01) |
| *G06F 9/455* | (2006.01) |

(52) U.S. Cl.
CPC ............ *H04L 41/04* (2013.01); *H04L 43/0817* (2013.01); *H04L 67/10* (2013.01); *G06F 2009/45583* (2013.01)
USPC .......................................... 709/209; 709/238

(58) Field of Classification Search
CPC ....................................................... H04L 41/04
USPC .................................. 709/201–203, 209, 238
See application file for complete search history.

(56) References Cited

U.S. PATENT DOCUMENTS

| | | | | |
|---|---|---|---|---|
| 6,389,549 | B1 * | 5/2002 | Murase | 713/502 |
| 7,587,465 | B1 | 9/2009 | Muchow | |
| 8,320,282 | B2 * | 11/2012 | Rollins | 370/258 |
| 2005/0055418 | A1 * | 3/2005 | Blanc et al. | 709/209 |
| 2006/0168192 | A1 | 7/2006 | Sharma et al. | |
| 2008/0281938 | A1 * | 11/2008 | Rai et al. | 709/209 |
| 2009/0072944 | A1 * | 3/2009 | Hayward | 340/2.1 |

\* cited by examiner

*Primary Examiner* — Andrew Chriss
*Assistant Examiner* — Romani Ohri

(57) ABSTRACT

Selecting a master node in a group of computing nodes. Computing nodes exchange suitability messages, candidate messages, and master messages to indicate the state of each node. A deterministic algorithm based on scores and timings is executed by each computing node to encourage each node to select the same master node.

20 Claims, 9 Drawing Sheets

SELECTING A MASTER NODE USING A SUITABILITY VALUE

CROSS-REFERENCE TO RELATED APPLICATION(S)

This application is a Continuation of U.S. patent application Ser. No. 13/006,132, filed Jan. 13, 2011, which is incorporated by reference herein, issued on Oct. 15, 2014 as U.S. Pat. No. 8,560,626.

BACKGROUND

Groups of computing nodes generally include one "master" node and any number of "non-master" or "subordinate" nodes. The master node may manage resources, such as a distributed state, and may further coordinate activity among the non-master nodes.

SUMMARY

One or more embodiments described herein select a master computing node based on a suitability of the selected node to act as a master node with respect to a plurality of computing nodes. Unique identifiers associated with the computing nodes may be used to select a master node from computing nodes with equal suitability values. Upon initialization and/or after losing a connection to an existing master node, the computing nodes begin a process of transmitting, receiving, and comparing suitability values and unique identifiers, such that all nodes in the group select the same master node.

DETAILED DESCRIPTION

Embodiments provided herein employ a deterministic master node selection process at each computing node in a group of computing nodes. The selection process is based on suitability values and unique identifiers (IDs) associated with the computing nodes and a predefined timing scheme that dictates how long computing nodes remain in certain states.

The suitability value associated with a computing node represents the suitability of the computing node to act as the master node for the group. In exemplary embodiments, the suitability value includes a performance metric that indicates an operational state or attribute of the computing node. For example, the performance metric may indicate resources, such as processing, storage, and/or communication resources, that are available to the computing node and/or may indicate any attribute of the computing node that may affect the speed or the effectiveness with which the computing node will operate as a master node.

The master node selection process of the disclosure enables a group of computing nodes to select which computing node will operate as a master node without relying on an election algorithm, which may require that one computing node receive a majority of "votes" to obtain master node status. Accordingly, a master node may be deterministically selected even when a large number of computing nodes (e.g., one half of a two-blade cluster) becomes unavailable or unresponsive.

As used herein, the term "computing node" refers to a computing device and/or software executed by a computing device (e.g., a virtual machine). Computing nodes are configured to communicate with each other via a communication channel, such as a network, a shared data bus, and/or shared memory. As described in more detail below, communication between computing nodes may include messages, such as suitability messages, candidate messages, and master messages.

Figure 1:
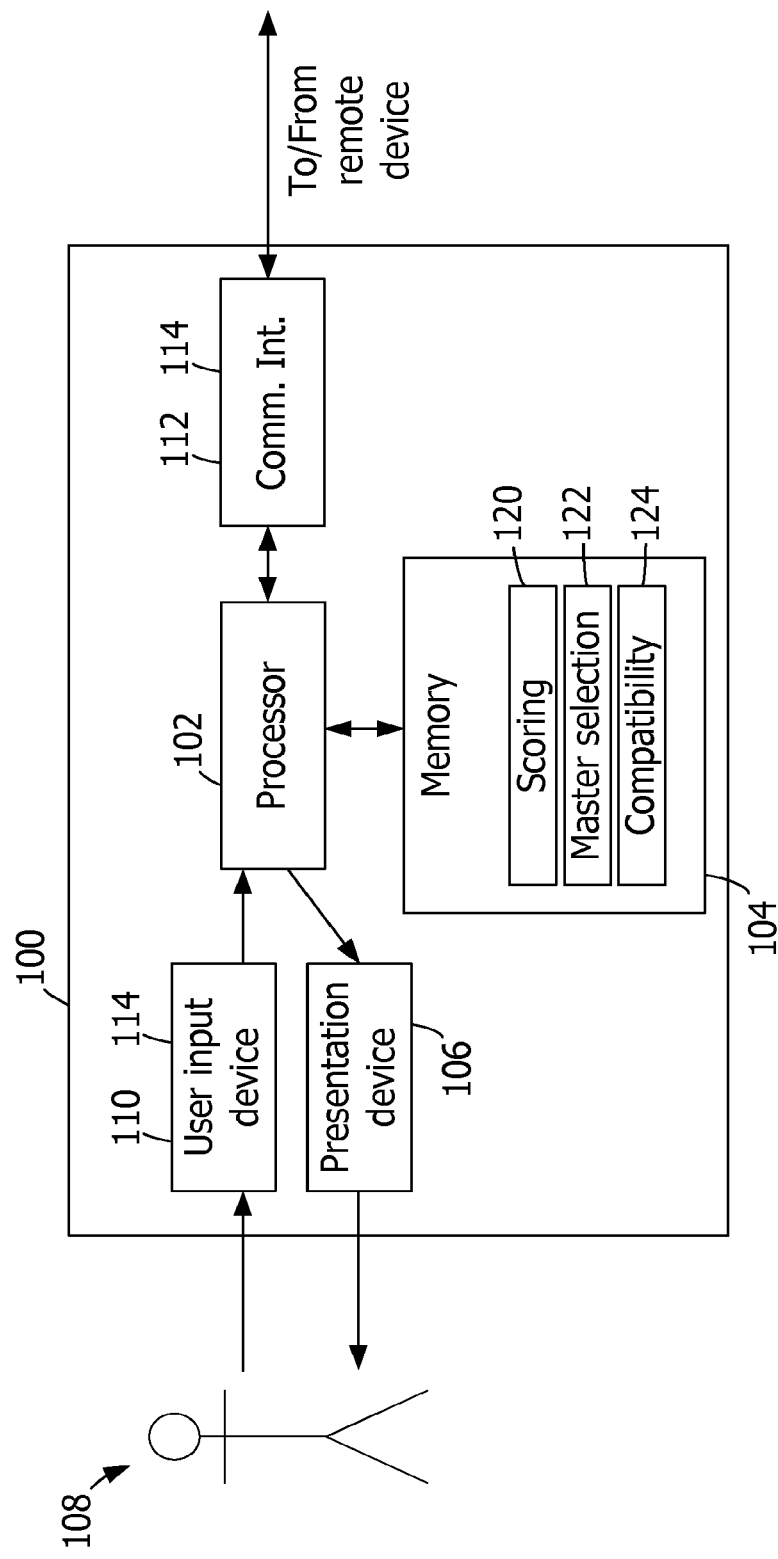
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, suitability values, configuration options (e.g., predetermined durations for receiving transmissions), and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

In some embodiments, computing device 100 includes a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a communication interface 112, which enables computing device 100 to communicate with a remote device (e.g., another computing device 100) via a communication medium, such as a wired or wireless network. For example, computing device 100 may transmit and/or receive messages (e.g., suitability messages, candidate messages, and/or master messages) via communication interface 112. User input device 110 and/or communication interface 112 may be referred to as an input interface 114.

In some embodiments, memory 104 stores computer-executable instructions for performing one or more of the operations described herein. Memory 104 may include one or more computer-readable storage media that have computer-executable components embodied thereon. In exemplary embodiments, memory 104 includes a scoring component 120, a master selection component 122, and, optionally, a compatibility component 124.

When executed by processor 102, scoring component 120 causes the processor to determine a first suitability value representing a suitability of a first computing device to act as a master node with respect to a plurality of computing devices hosting a plurality of virtual machines. When executed by processor 102, master selection component 122 causes processor 102 to transmit to the plurality of computing devices a first candidate message representing a proposal by the first computing device to act as a master computing device. The first candidate message includes the first suitability value. Master selection component 122 also causes processor 102 to receive a second candidate message representing a proposal by a second computing device of the plurality of computing devices to act as a master computing device. The second candidate message includes a second suitability value associated with the second computing device. When the second suitability value is greater than the first suitability value, master selection component causes processor 102 to select the second computing device as a candidate computing device. When executed by processor 102, compatibility component 124 causes processor 102 to disregard a received message when the received message is associated with master selection algorithm that is not identical to a master selection algorithm associated with the first computing device.

Figure 2:
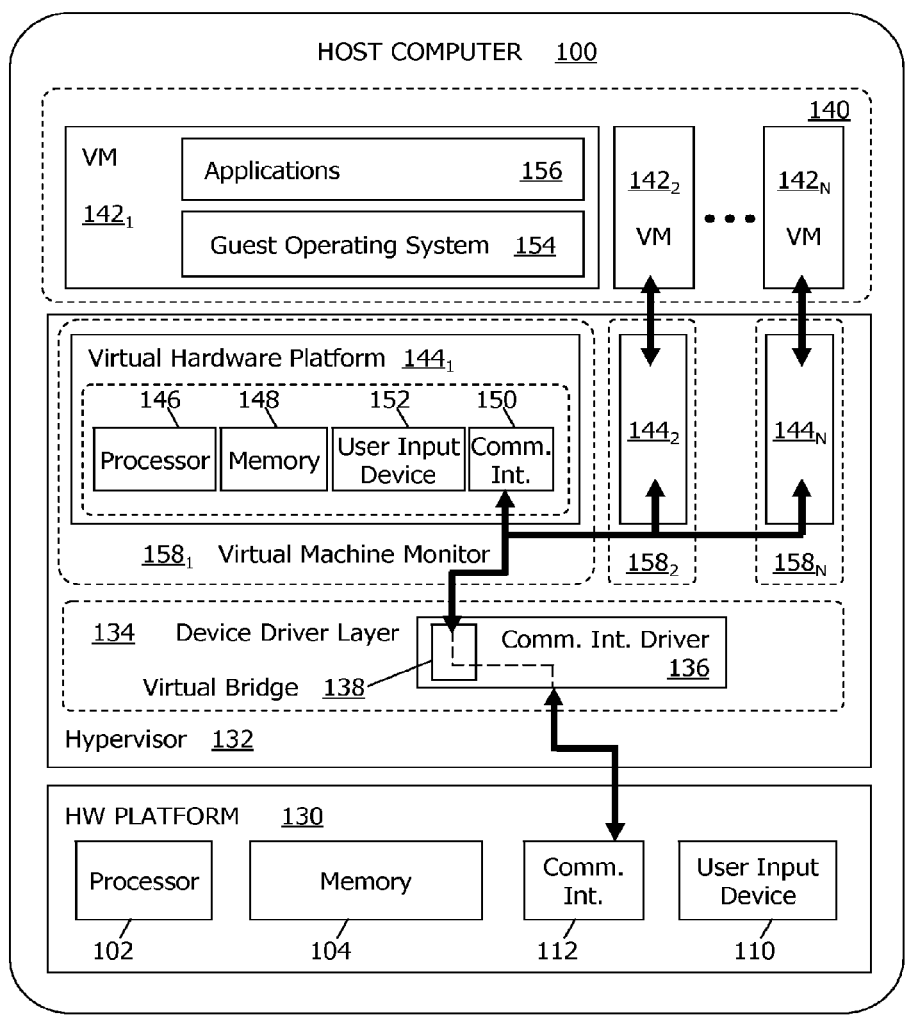
FIG. 2 is a block diagram of virtual machines that are instantiated on a computing device, such as the computing device shown in FIG. 1.

FIG. 2 depicts a block diagram of virtual machines $142_1$, $142_2 \ldots 142_N$ that are instantiated on a computing device 100, which may be referred to as a "host". Computing device 100 includes a hardware platform 130, such as an x86 architecture platform. Hardware platform 130 may include processor 102, memory 104, communication interface 112, user input device 110, and other input/output (I/O) devices, such as a presentation device 106 (shown in FIG. 1). A virtualization software layer, also referred to hereinafter as a hypervisor 132, is installed on top of hardware platform 130.

The virtualization software layer supports a virtual machine execution space 140 within which multiple virtual machines (VMs $142_1$-$142_N$) may be concurrently instantiated and executed. Hypervisor 132 includes a device driver layer 134, and maps physical resources of hardware platform 130 (e.g., processor 102, memory 104, communication interface 112, and/or user input device 110) to "virtual" resources of each of VMs $142_1$-$142_N$ such that each of VMs $142_1$-$142_N$ has its own virtual hardware platform (e.g., a corresponding one of virtual hardware platforms $144_1$-$144_N$), each virtual hardware platform having its own emulated hardware (such as a processor 146, a memory 148, a communication interface 150, a user input device 152 and other emulated I/O devices in VM $142_1$).

In some embodiments, memory 148 in virtual hardware platform $144_1$ includes a virtual disk that is associated with or "mapped to" one or more virtual disk files stored in memory 104 (e.g., a hard disk or solid state disk) of host 100. In addition, or alternatively, virtual disk files may be stored in memory 104 of one or more remote computing devices 100, such as in a storage area network (SAN) configuration. In such embodiments, any quantity of virtual disk files may be stored by the remote computing devices 100.

Device driver layer 134 includes, for example, a communication interface driver 136 that interacts with communication interface 112 to receive and transmit data from, for example, a local area network (LAN) connected to computing device 100. Communication interface driver 136 also includes a virtual bridge 138 that simulates the broadcasting of data packets in a physical network received from one communication interface (e.g., communication interface 112) to other communication interfaces (e.g., the virtual communication interfaces of VMs $142_1$-$142_N$). Each virtual communication interface for each VM $142_1$-$142_N$, such as communication interface 150 for VM $142_1$, may be assigned a unique virtual Media Access Control (MAC) address that enables virtual bridge 138 to simulate the forwarding of incoming data packets from communication interface 112. In one embodiment, communication interface 112 is an Ethernet adapter that is configured in "promiscuous mode" such that all Ethernet packets that it receives (rather than just Ethernet packets addressed to its own physical MAC address) are passed to virtual bridge 138, which, in turn, is able to further forward the Ethernet packets to VMs $142_1$-$142_N$. This configuration enables an Ethernet packet that has a virtual MAC address as its destination address to properly reach the VM in computing device 100 with a virtual communication interface that corresponds to such virtual MAC address.

Virtual hardware platform $144_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 154 in order to execute applications 156 for an instantiated VM, such as VM $142_1$. Virtual hardware platforms $144_1$-$144_N$ may be considered to be part of virtual machine monitors (VMM) $158_1$-$158_N$ which implement virtual system support to coordinate operations between hypervisor 132 and corresponding VMs $142_1$-$142_N$. Those with ordinary skill in the art will recognize that the various terms, layers, and categorizations used to describe the virtualization components in FIG. 2 may be referred to differently without departing from their functionality or the spirit or scope of the invention. For example, virtual hardware platforms $144_1$-$144_N$ may also be considered to be separate from VMMs $158_1$-$158_N$, and VMMs $158_1$-$158_N$ may be considered to be separate from hypervisor 132. One example of hypervisor 132 that may be used in an embodiment of the invention is included as a component in VMware's ESX brand product, which is commercially available from VMware, Inc.

Figure 3:
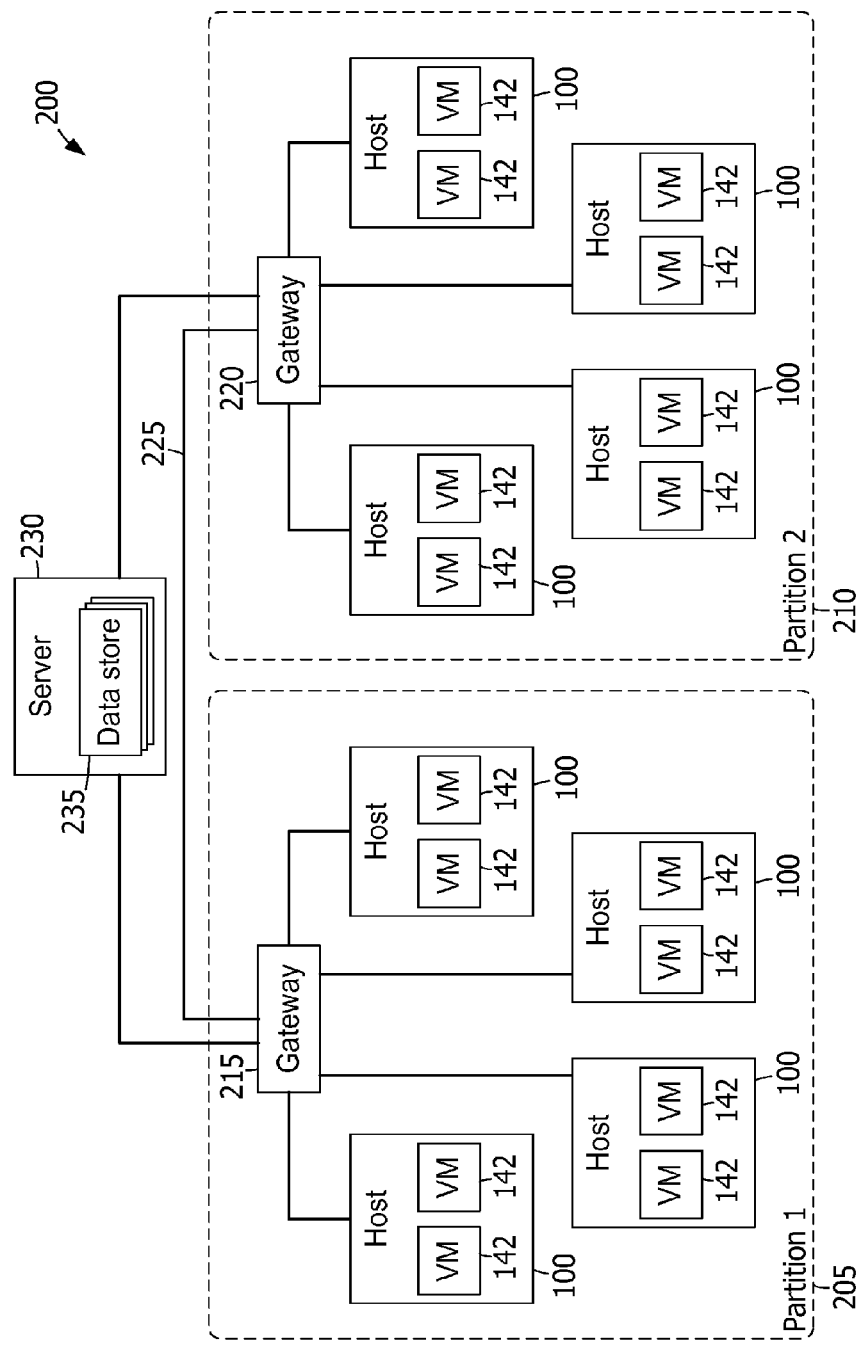
FIG. 3 is a block diagram of an exemplary cluster of computing devices and virtual machines.

FIG. 3 is a block diagram of an exemplary cluster 200 of hosts 100 and virtual machines (VMs) 142. Cluster 200 includes a first partition 205 and a second partition 210 of four hosts 100 each. Hosts 100 in first partition 205 communicate with each other via a first gateway 215. Hosts 100 in second partition 210 communicate with each other via a second gateway 220. Further, first gateway 215 and second gateway 220 communicate with each other via an inter-partition link 225, such that hosts 100 in first partition 205 are capable of communicating with hosts 100 in second partition 210.

Cluster 200 also includes a server 230 with a plurality of data stores 235. In exemplary embodiments, server 230 is a computing device 100 with a memory 104 configured to store data stores 235. Hosts 100 communicate with server 230 via first gateway 215 and/or second gateway 220 to access data stores 235. For example, hosts 100 may execute one or more VMs 142, which are associated with virtual disk files, configuration files, and/or other data (e.g., semaphores) stored in file systems provided by data stores 235. In some embodiments, a mutually exclusive ("mutex") lock associated with a file system is used to indicate control of any VMs 142 associated with files contained in the file system. For example, a host 100 may obtain a mutex lock to a data store 235 including one or more file systems and thereby obtain control over all VMs 142 associated with files in any of those file systems. The host 100 may therefore monitor and/or control these associated VMs 142.

In exemplary embodiments, the presence, status, and/or content of file systems and/or VM-related files in data stores 235 indicates a shared state of cluster 200. For example, hosts 100 may determine control relationships between other hosts 100 and VMs 142 based on the presence of mutex locks. Because the locks operate in a mutually exclusive manner, only one host 100 may possess a mutex lock to a data store 235, and therefore have the ability to modify the shared state, at any point in time. Each host 100 may be configured to control a VM 142 only when the host 100 can obtain a mutex lock to a data store 235 corresponding to the VM 142, such that no two hosts 100 concurrently attempt to manage the VM 142. The presence of mutex locks therefore provides an indication of shared state to hosts 100 in cluster 200. In addition, or alternatively, hosts 100 and/or server 230 may maintain other forms of shared state, such as shared data structures, which may be stored by server 230 and/or hosts 100 and/or may be continually or periodically communicated throughout cluster 200 by hosts 100.

To coordinate the activity of hosts 100 and/or VMs 142, one host 100 may operate as a master computing device, which may also be referred to as a master node. The hosts 100 other than the master node may be referred to as subordinate computing devices or subordinate nodes.

The methods described herein may be executed by each host 100 within cluster 200, such that each computing node selects the same master node. In some scenarios, a malfunction (e.g., a failure of inter-partition link 225), may divide computing devices into isolated groups, such as first partition 205 and second partition 210. Exemplary embodiments enable each group to automatically select a master node. Further, when the malfunction is resolved, and the groups are combined, embodiments herein enable the previously selected master nodes to determine which one will remain a master node and which one(s) will become subordinate.

Figure 4:
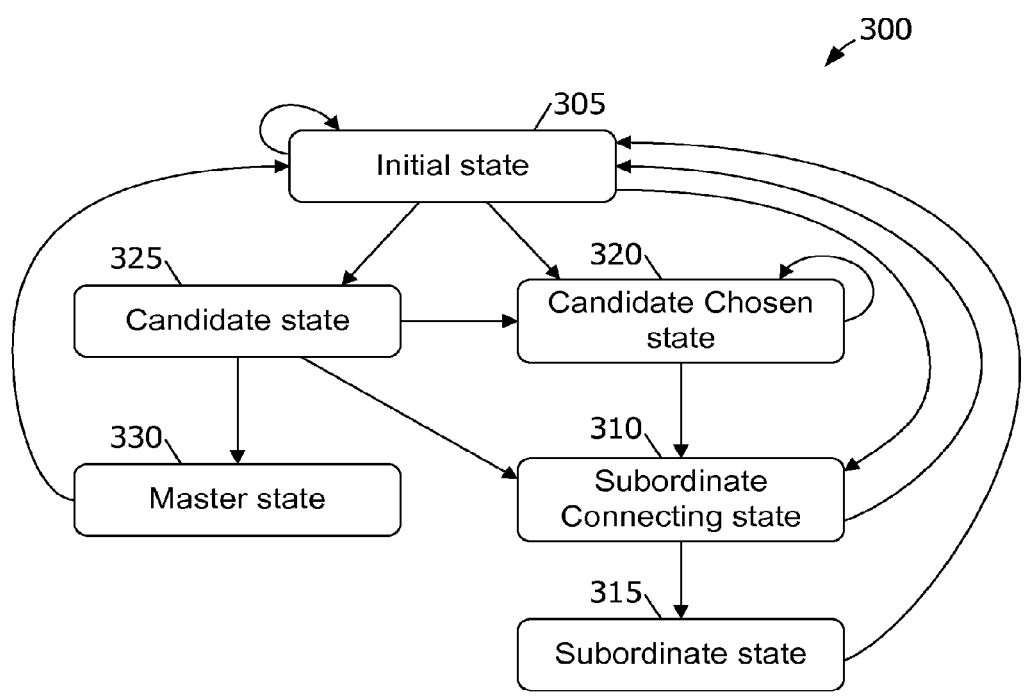
FIG. 4 is an exemplary state diagram representing states and state transitions used in exemplary methods for selecting a master node.

FIG. 4 is an exemplary state diagram 300 representing states and state transitions used in exemplary methods for selecting a master node. State diagram 300 includes an initial state 305, a subordinate connecting state 310, a subordinate state 315, a candidate chosen state 320, a candidate state 325, and a master state 330. Initial state 305 is described with reference to FIG. 5. Subordinate connecting state 310 and subordinate state 315 are described with reference to FIG. 6. Candidate chosen state 320 is described with reference to FIG. 7. Candidate state 325 is described with reference to FIG. 8. Master state 330 is described with reference to FIG. 9.

Although embodiments are described herein with reference to particular states, the methods provided may be practiced with different states or without any states. In exemplary embodiments, the methods described are performed by computing nodes, such as each host 100 in cluster 200 (shown in FIG. 3). The computing nodes communicate with each other through an exchange of messages. A computing node may transmit such a message as a broadcast message (e.g., to an entire network and/or data bus), a multicast message (e.g., addressed to all other computing nodes), and/or as a plurality of unicast messages, each of which is addressed to an individual computing node. Further, in exemplary embodiments, messages are transmitted using a network protocol that does not guarantee delivery, such as User Datagram Protocol (UDP). Accordingly, when transmitting a message, a computing node may transmit multiple copies of the message, enabling the computing node to reduce the risk of non-delivery. In exemplary embodiments, the messages exchanged between computing nodes include suitability messages, candidate messages, and master messages.

Listed below is an exemplary definition of data types that may be used with messages exchanged between computing nodes.

```
typedef enum {
    SUITABILITY_MSG,
    CANDIDATE_MSG,
    MASTER_MSG,
    VERSION_MSG,
} SelectionMsgType;
typedef uint64 SelectionId;
```

Listed below is an exemplary definition of a data structure that may be used to express messages exchanged between computing nodes.

```
typedef struct SelectionMsg {
    SelectionMsgType type;
    uint64 buildNumber;
    int64 sequenceNumber;
    uint32 faultDomainIdLength;
    char faultDomainIdData[maxSelectionMsgFaultDomainIdLength + 1];
    uint32 hostIdLength;
    char hostIdData[maxSelectionMsgHostIdLength + 1];
    SelectionId selectionId;
    uint32 timeoutUS;
    uint64 nodeSuitability;
    uint32 tcpPort;
    VersionArray versions;
} SelectionMsg;
```

A suitability message is transmitted by a computing node in initial state 305 and includes a suitability value and a timeout value. The suitability value represents the suitability of the computing node to act as the master node. The timeout value indicates the duration for which the computing node will wait to receive a candidate message or a master message before advancing to candidate state 325.

A candidate message is transmitted by a computing node in candidate state 325. A candidate message represents a proposal or an offer by the computing node to act as the master node and includes a score. The score includes the suitability value previously sent in a suitability message and a unique identifier (ID) of the computing node. The unique ID may be used to resolve a tie between computing nodes with equal suitability values. The candidate message also includes a timeout value that indicates the duration for which the computing node will wait to receive either a master message or a candidate message with a score higher than the computing node's own score before advancing to master state 330.

A master message is transmitted by a computing node in master state 330. A master message indicates that the computing node is acting as the master node and includes the score of the computing node. In some embodiments, a computing node transmitting a master message accepts connections and/or service requests from subordinate nodes.

Messages may be checked for compatibility prior to processing. In some embodiments, each message includes an identifier of master node selection algorithm, such as a software build number or a version number. Each computing node is associated with a build number that identifies the algorithm executed by the computing node. If the build number in an incoming message is not identical to the build number associated with the computing node, the message may be disregarded.

In exemplary embodiments, each computing node selects only one master node. Until the master node is selected, the computing node evaluates messages received from other computing nodes to select a candidate node, which represents the computing node that has been determined to be the most suitable to act as the master node. In such embodiments, as new messages are received and evaluated, the candidate node may change, but only one computing node is designated as the candidate node.

Computing nodes may refer to each other using identifiers (ID) that are associated with each computing node. An ID may include a manually assigned or automatically assigned name, number, address (e.g., network address), or other device capable of referencing a computing node. Referring to FIG. 3, each computing node (e.g., host 100 and/or VM 142) in cluster 200 is associated with an ID that is unique within cluster 200. In other words, each ID is associated with at most one computing node in cluster 200.

In some states, the suitability values and/or the unique IDs of two computing nodes are compared. The combination of a suitability value and a unique ID may be referred to as a score. In some embodiments, the numerical value of a score is determined by appending the unique ID of a computing node to the suitability value of the computing node, with the most significant digits corresponding to the suitability value. Accordingly, when two scores are compared, if the suitability values differ, the score with the greater suitability value is considered greater. If the suitability values are equal, the score with the greater unique ID is considered greater.

Further, in some states, operations are performed based on timeout conditions. A timeout occurs when some event (e.g., the receipt of a particular type of message) does not occur within a predetermined duration. In exemplary embodiments, computing nodes are configured with identical predetermined durations (e.g., StartupTimeout and MasterTimeout, described below).

Figure 5:
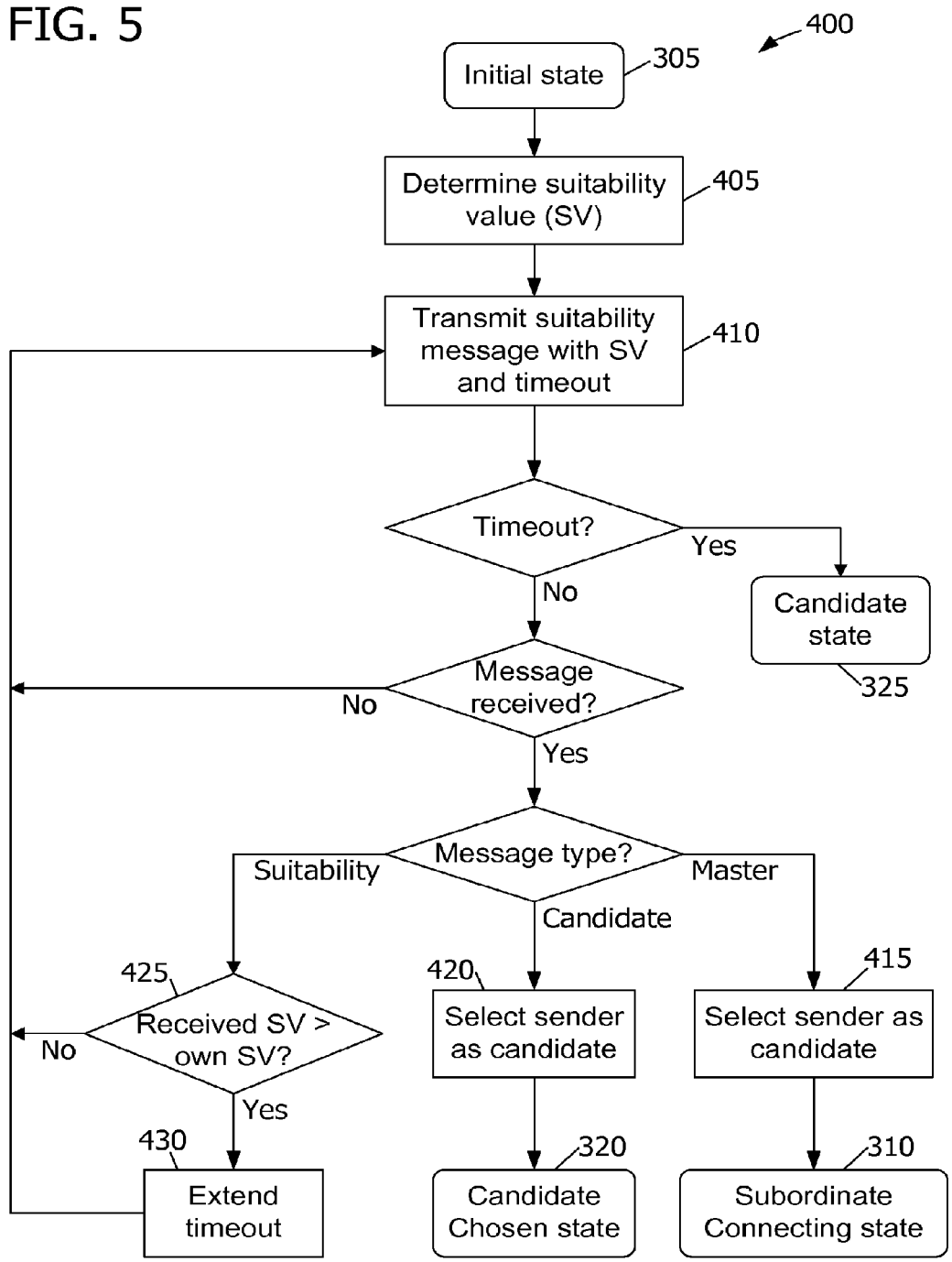
FIG. 5 is a flowchart of an exemplary method associated with the initial state shown in FIG. 4.

FIG. 5 is a flowchart of an exemplary method 400 associated with initial state 305. A computing node may enter initial state 305 upon initialization or "startup" of the computing node and/or upon losing a connection to a previously selected master node. Referring to FIGS. 3 and 5, the computing node determines 405 a suitability value representing a suitability of the computing node to act as a master node in cluster 200. In exemplary embodiments, the suitability value is based on a performance metric that indicates an operational state or attribute of the computing node. For example, in the context of cluster 200, the suitability value may be equal to the quantity of data stores 235 to which a host 100 is connected, which generally indicates the ability of the host 100 to obtain mutex locks. Other performance metrics include processor speed, memory capacity, network bandwidth, and/or any attribute of the computing node that may affect the speed or the effectiveness with which the computing node operates as a master node. In some embodiments, multiple performance metrics are combined to create a suitability value. For example, the suitability value may be equal to an average, optionally weighted, of the individual performance metrics.

The computing node transmits 410 a suitability message including the suitability value and a timeout value. The timeout value represents a duration for which the computing node will remain in initial state 305. Initially, the timeout value is set based on a predetermined duration, referred to as StartupTimeout. In some embodiments, the timeout value is expressed as a duration, with the initial timeout value equal to StartupTimeout, and the timeout value is subsequently decreased to reflect the amount of time that has passed since the timeout value was set. A timeout occurs when the predetermined duration has elapsed (e.g., the timeout value reaches zero). In other embodiments, the timeout value is expressed as an absolute time that is equal to the current time plus StartupTimeout. In such embodiments, the timeout value may be converted to a duration by subtracting the current time from the timeout value. A timeout occurs when the current time is greater than or equal to the timeout value. Other timeout values described herein may be expressed similarly.

While in initial state 305, the computing node waits to receive messages from other computing nodes and repeatedly (e.g., continually or periodically) transmits 410 the suitability message. When the computing node receives a master message, the computing node selects 415 the sender of the master message as the candidate node. The computing node advances to subordinate connecting state 310, described below with reference to FIG. 6.

When the computing node receives a candidate message while in initial state 305, the computing node selects 420 the sender of the candidate message as the candidate node. The computing node then advances to candidate chosen state 320, described below with reference to FIG. 7.

When the computing node receives a suitability message from another computing node, the computing node compares 425 the suitability value of the other computing node to its own suitability value. If the received suitability value is greater, the computing node extends 430 its timeout value based on the timeout value in the received suitability message. Otherwise, the computing device disregards the suitability message. Extending 430 the timeout value enables the other computing node to advance to candidate state 325, at which point a candidate message may be received from the other computing node. In exemplary embodiments, the timeout value is extended 430 by setting the timeout value to the larger of 1) the current timeout value, and 2) the sum of the received timeout value and a duration referred to as StartupDelay. StartupDelay is approximately equal to (e.g., within 1%, 5%, or 10% of) the expected time required for the other computing node to advance to candidate state 325 and transmit a candidate message.

In some embodiments, the timeout value may be extended 430 only to a maximum value. For example, the maximum value may be defined as the sum of StartupTimeout, StartupDelay, and a duration referred to as MasterTimeout. MasterTimeout is equal to (e.g., within 1%, 5%, or 10% of) the expected time required for a computing node to determine that a selected master node is not available.

When no master message or candidate message is received before a timeout occurs, the computing node advances to candidate state 325, described below with reference to FIG. 8.

Figure 6:
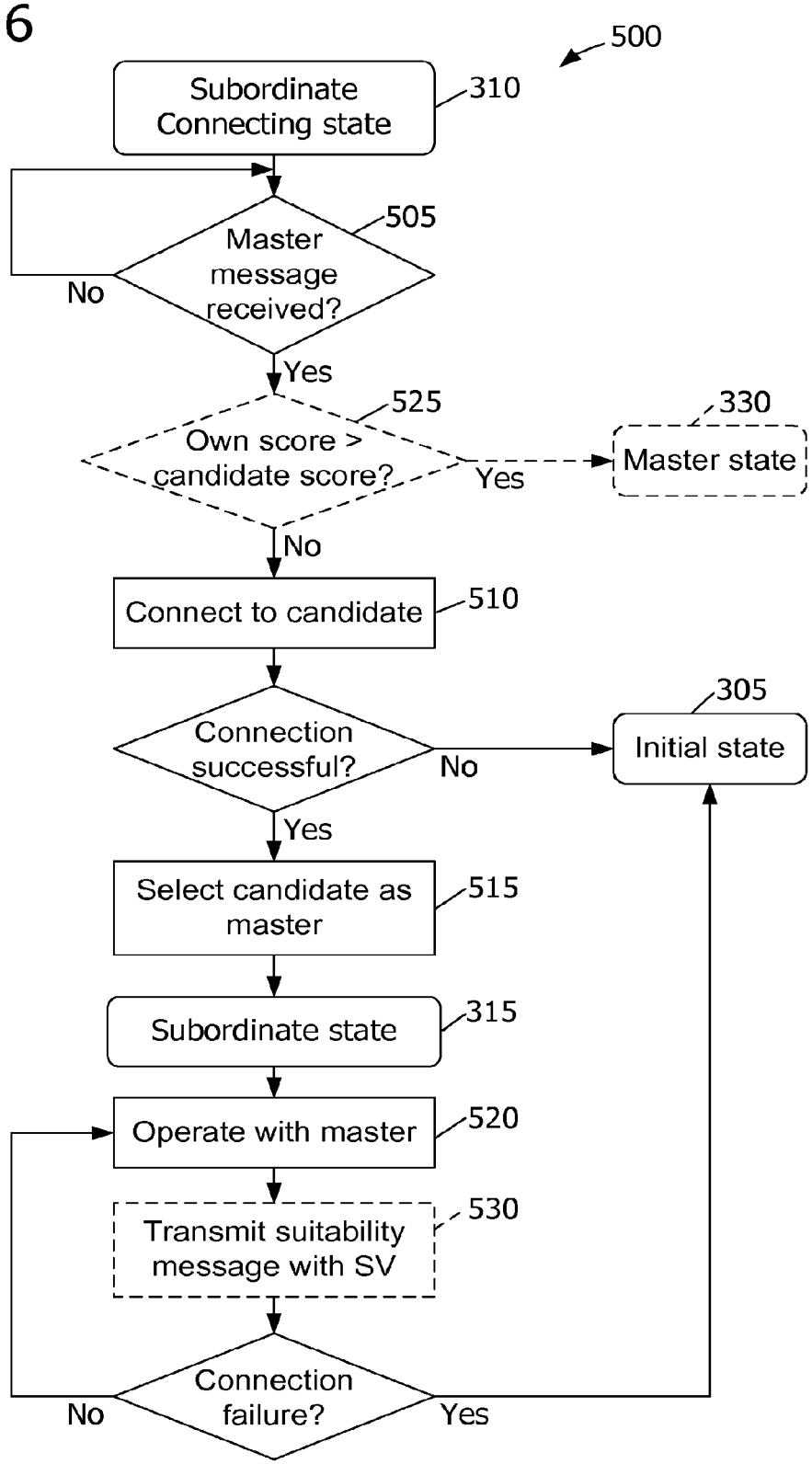
FIG. 6 is a flowchart of an exemplary method associated with the subordinate connecting state and the subordinate state shown in FIG. 4.

FIG. 6 is a flowchart of an exemplary method 500 associated with subordinate connecting state 310 and subordinate state 315. In exemplary embodiments, a computing node enters subordinate connecting state 310 when a master message has been received or when the computing node has selected a candidate node and not received a master message within a timeout duration. If no master message has yet been received, the computing device waits 505 until a master message is received.

With the master message received, and the computing node in subordinate connecting state 310, the computing node has identified a candidate node which will be treated as a master node. The computing node attempts to connect 510 to the candidate node as a subordinate node. In exemplary embodiments, connecting 510 to the candidate node includes requesting a service from the candidate node, such as registration of the computing node, management of the computing node, and/or access to a data store 235 (shown in FIG. 3). In some embodiments, prior to connecting 510 to the candidate node, the computing node compares 525 its own score to the score associated with the candidate node and advances to master state 330 if its own score is greater. Otherwise, the computing node attempts to connect 510 to the candidate node, as described above.

If the connection is not successful, the computing node returns to initial state 305, described above with reference to FIG. 5. If the connection is successful, the computing node selects 515 the candidate node as the master node and remains connected to the master node, advancing to subordinate state 315. In subordinate state 315, the computing node operates 520 with the master node, responding to any requests issued to the computing node by the master node and potentially making requests to the master node. The computing node will remain in subordinate state 315 until the computing node detects a failure in its connection to the master node. When the master node connection fails, the computing node returns to initial state 305.

Optionally, the computing node repeatedly (e.g., continually or periodically) transmits 530 a suitability message including the suitability value of the computing node while operating 520 with the master node. In some embodiments, the suitability message is used by the master node to determine whether to allow another computing node to become the master node, as described below with reference to FIG. 9. The suitability message may be transmitted 530 without a timeout value.

Figure 7:
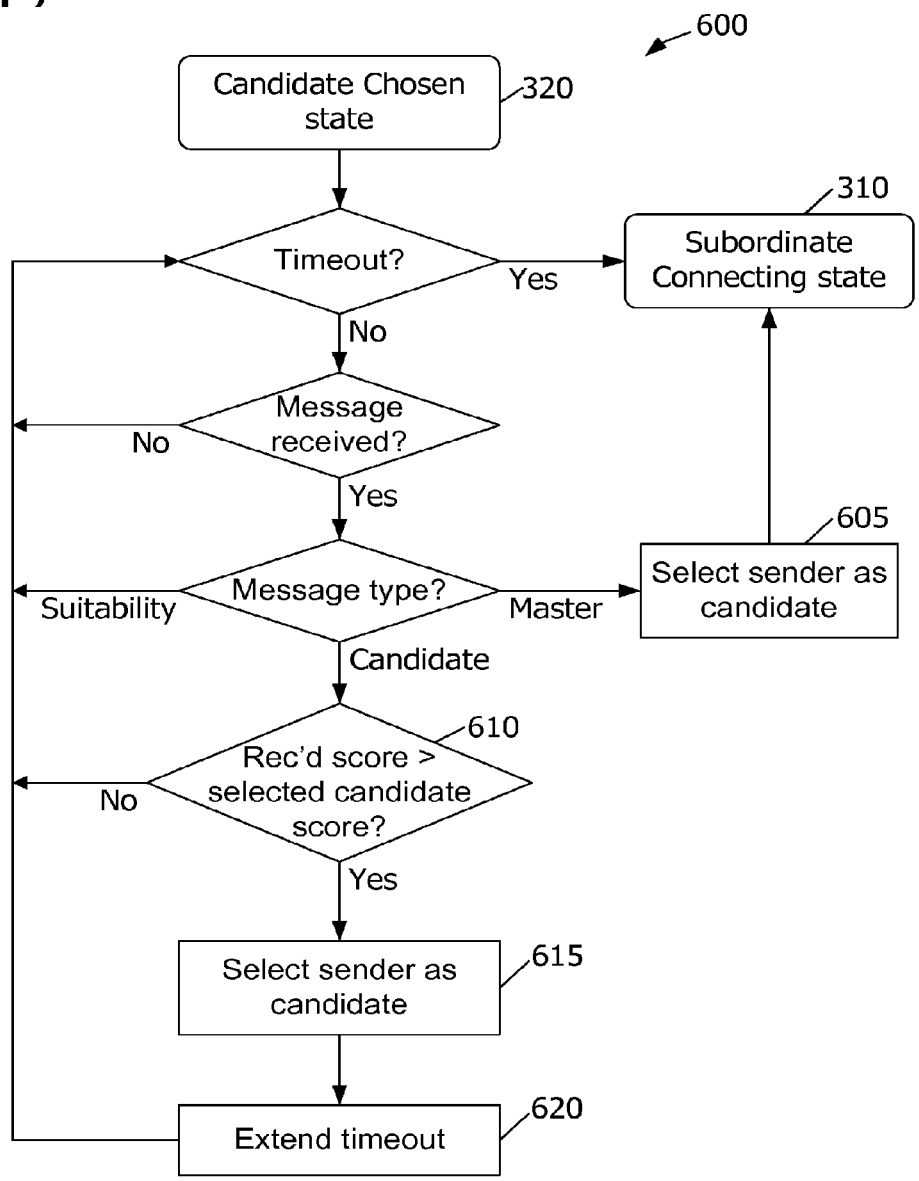
FIG. 7 is a flowchart of an exemplary method associated with the candidate chosen state shown in FIG. 4.

FIG. 7 is a flowchart of an exemplary method 600 associated with candidate chosen state 320. In exemplary embodiments, a computing node enters candidate chosen state 320 when a candidate message is received in initial state 305 or when a candidate message having a greater score than the computing node's score is received in candidate state 325. In either case, the computing node has designated a candidate node.

Further, each candidate message includes a duration, referred to as a selection timeout value, which is set by the sender. The computing node uses the selection timeout value from the received candidate message to determine when a timeout occurs in candidate chosen state 320. More specifically, the computing node may initialize a countdown timer to the selection timeout value, and a timeout may be determined to occur when the countdown timer reaches zero.

Prior to the occurrence of a timeout, if the computing node receives a master message, the computing node selects 605 the sender of the master message as the candidate node and advances to subordinate connecting state 310, without waiting for the timeout. If the computing node receives a candidate message, the computing node compares 610 the score (e.g., the suitability value and the unique identifier) from the received candidate message with the score associated with the selected candidate node. If the received suitability value is greater, the computing node selects 615 the sender of the candidate message as the candidate node and extends 620 the selection timeout value based on a timeout value included in the candidate message. For example, the computing node may set the selection timeout value equal to the timeout value from the candidate message.

When no candidate message or master message is received before the selection timeout occurs, the computing node advances to subordinate connecting state 310, described above with reference to FIG. 6.

Figure 8:
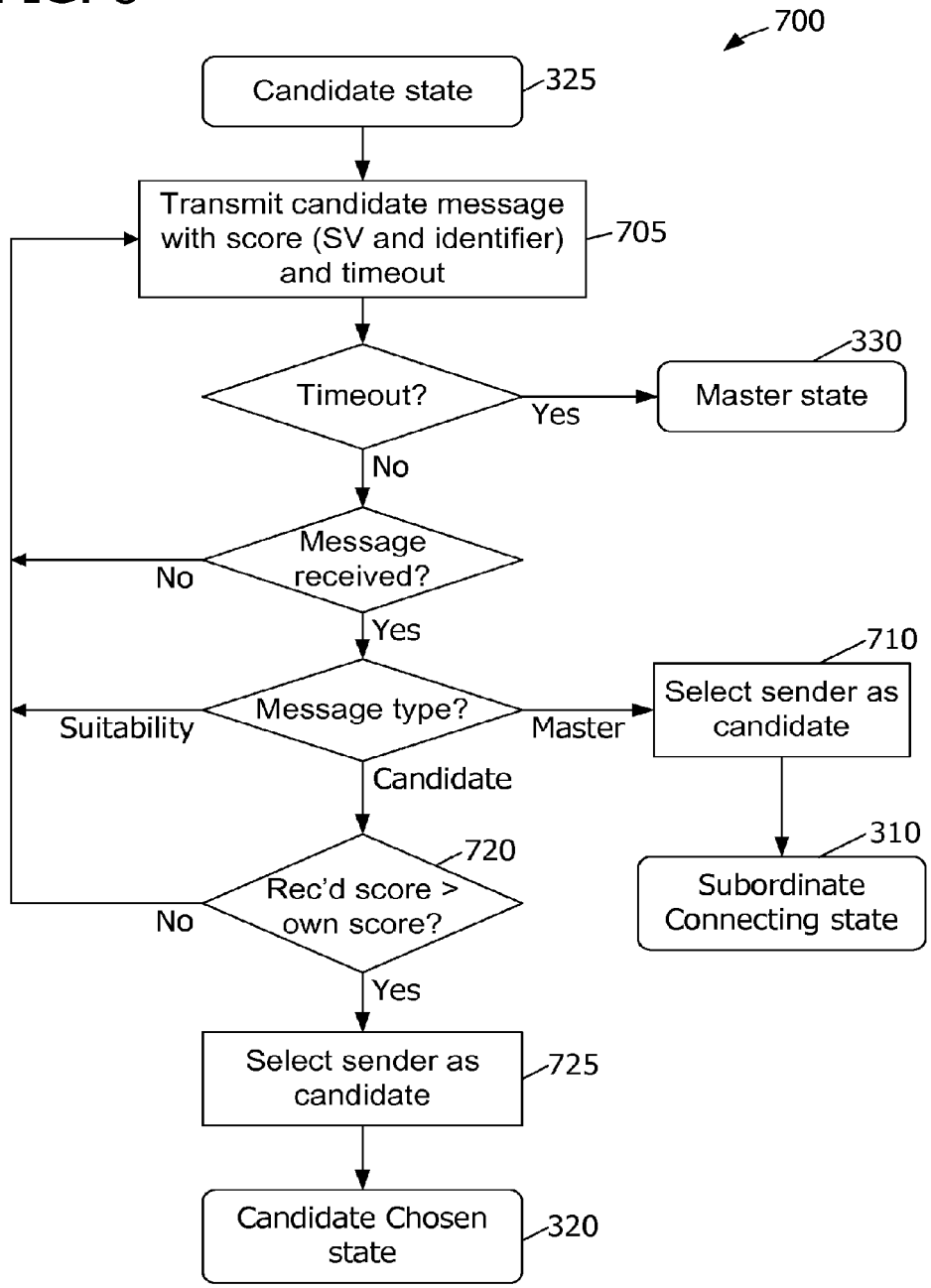
FIG. 8 is a flowchart of an exemplary method associated with the candidate state shown in FIG. 4.

FIG. 8 is a flowchart of an exemplary method 700 associated with candidate state 325. In exemplary embodiments, a computing node enters candidate state 325 when no candidate message or master message is received while the computing node is in initial state 305.

The computing node creates and transmits 705 a candidate message representing a proposal or an offer by the computing node to act as the master node. The candidate message includes a score (e.g., a suitability value and a unique identifier) associated with the computing node. The candidate message also includes a duration, referred to as a selection timeout value, which may be initially set to a predetermined duration. The selection timeout value indicates the duration for which the computing node will remain in candidate state 325, waiting, before advancing to master state 330.

Prior to the selection timeout, if a master message is received, the computing node selects 710 the sender of the master message as the candidate node and advances to subordinate connecting state 310. If a candidate message is received from another computing node, the computing node compares 720 the score from the received candidate message with its own score. If the received score is greater than the computing node's score, the computing node selects 725 the sender of the candidate message as the candidate node and advances to candidate chosen state 320, described above with reference to FIG. 7.

If the computing node receives no message, a suitability message, or a candidate message with a score that is not greater than the computing node's own score, the computing node again transmits 705 the candidate message, with the selection timeout value decreased by the amount of time that has passed since the selection timeout value was initially set. The computing node repeatedly (e.g., continually or periodically) transmits 705 the candidate message while also evaluating incoming messages. A selection timeout occurs when the selection timeout value reaches zero. If the computing node has not received, prior to the selection timeout, a master message indicating that another computing node is acting as a master node or a candidate message that includes a score greater than the score of the computing node, the computing node advances to master state 330, described below with reference to FIG. 9.

Figure 9:
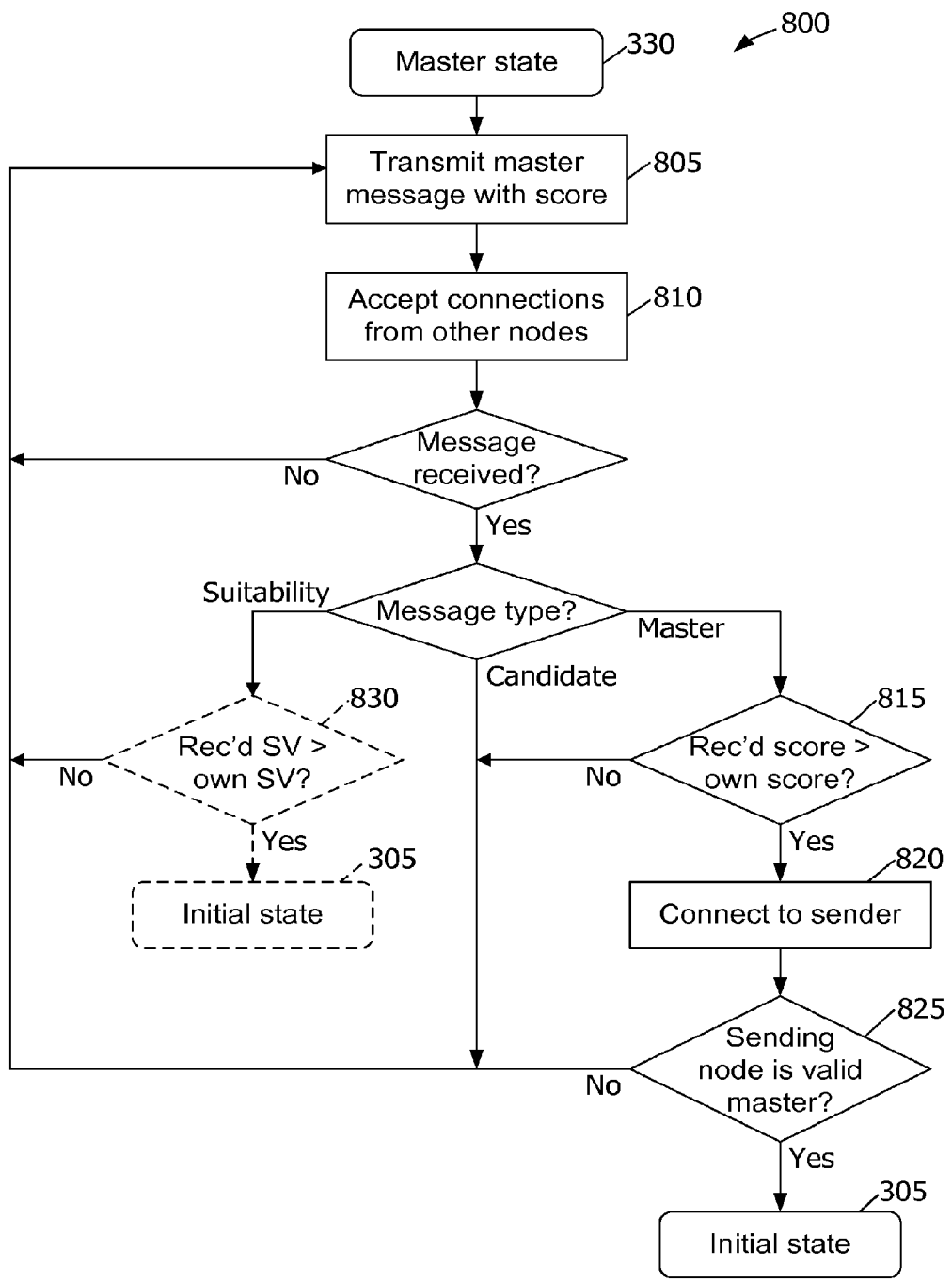
FIG. 9 is a flowchart of an exemplary method associated with the master state shown in FIG. 4.

FIG. 9 is a flowchart of an exemplary method 800 associated with master state 330. Generally, a computing node in master state 330 operates as the master node.

In exemplary embodiments, the computing node transmits 805 a master message indicating that the computing node is acting as a master node. The master message includes the score associated with the computing node. The computing node accepts 810 connections from other computing nodes. For example, other computing nodes may attempt to connect 510 (shown in FIG. 6) to the computing node when treating the computing node as the master node.

The computing node repeatedly (e.g., continually or periodically) transmits 805 the master message while also evaluating incoming messages. In exemplary embodiments, the computing node disregards suitability messages and candidate messages. Alternatively, as described in more detail below, the computing node may return to initial state 305 if the computing node receives a suitability message with a suitability value greater than the suitability value of the computing node.

If a master message indicating that another node is acting as a master node is received, the computing node compares 815 the score from the received master message with the score of the computing node. If the received score is not greater than the computing node's score, the computing node disregards the master message. If the received score is greater than the computing node's score, the computing node connects 820 to the other computing node.

The computing node verifies 825 that the other computing node is a valid master node. For example, the computing node may determine whether the other computing node responds to requests as a master node is expected to. If the other computing node is a valid master node, the computing node returns to initial state 305.

In exemplary embodiments, all computing nodes in a group are programmed to execute the same master node selection algorithm. Accordingly, when two computing nodes are in master state 330, both nodes execute method 800, and one of the two nodes in master state 330 will return to initial state 305 while the other continues transmitting 805 master messages. Such embodiments enable a single computing node to be selected as the master node when two groups of computing nodes, each with a master node, are combined. For example, referring to FIG. 3, if a host 100 in first partition 205 is in master state 330, and inter-partition link 225 fails, hosts 100 in first partition 205 will continue operating with that host 100 as the master node. Hosts 100 in second partition 210 will detect a communication failure with the master node and select a master node within second partition 210. A master node therefore exists in first partition 205 and in second partition 210. When inter-partition link 225 is restored, and hosts 100 in first partition 205 and second partition 210 begin communicating with each other, the methods described above allow one of the two master nodes to abdicate its master status and return to initial state 305.

In some embodiments, when a computing node enters master state 330, the computing node remains in master state 330 indefinitely. In alternative embodiments, another computing node with a higher score is allowed to become the master node.

Referring to FIGS. 6 and 9, in one such embodiment, the computing node has selected a candidate node (e.g., the master node in this scenario) based on receiving a master message. Prior to connecting 510 to the candidate node, the computing node compares 525 the score associated with the candidate node to its own score. If the computing node's score is greater, the computing node advances to master state 330. Following method 800, the computing node will transmit 805 master messages with its score, and the previous master node will receive these master messages. The previous master node will compare 815 the scores and, if it can verify 825 that the new master node is a valid master node, the previous master node will return to initial state 305.

In another such embodiment, while operating 520 with the master node as a subordinate node in subordinate state 315, a computing node repeatedly (e.g., continually or periodically) transmits 530 a suitability message including the suitability value of the computing node. When the computing node in master state 330 receives the suitability message, that computing node compares 830 the received suitability value to its own suitability value. If the received suitability value is greater, the computing node returns to initial state 305, enabling another computing node, such as the sender of the suitability message, to be selected as the master node.

Exemplary Operating Environment

The determination of suitability and the selection of a master node as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selecting a master node in a group of computing nodes.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
    a memory for storing a first suitability value representing a performance metric associated with a first node of a plurality of computing nodes that execute a plurality of virtual machines;
    a communication interface configured to transmit a suitability message including the suitability value to the plurality of computing nodes; and
    a processor coupled to the memory and the communication interface, wherein the processor is programmed to:
        create a score including the first suitability value and an identifier associated with the first node;
        transmit via the communication interface a candidate message including the score and representing a proposal by the first node to act as a master node if the communication interface does not receive, within a first predetermined duration, a candidate message representing a proposal by another computing node to act as a master node or a master message indicating that another computing node is acting as a master node; and
        transmit via the communication interface a master message indicating that the first node is acting as a master node if the communication interface does not receive, within a second predetermined duration after the first predetermined duration, a candidate message that includes a suitability value greater than the first suitability value or a master message indicating that another computing node is acting as a master node;
    wherein the suitability message is a first suitability message including a first suitability value, the communication interface is further configured to receive a second suitability message including a second suitability value that represents a suitability of a second node of the plurality of computing nodes to act as a master node, and the processor is further programmed to extend the predetermined duration when the second suitability value is greater than the first suitability value.

2. The system of claim 1, wherein the suitability message includes a first timeout value representing the first predetermined duration.

3. The system of claim 1, wherein the second suitability message further includes a timeout value representing a time at which the second node will transmit a candidate message representing a proposal by the second node to act as a master node, and the processor is programmed to extend the predetermined duration based on the timeout value.

4. The system of claim 1, wherein the candidate message is a first candidate message including a first score, and when a second candidate message representing a proposal by a second node of the plurality of computing nodes to act as a master node is received during the first predetermined duration, the processor is further programmed to:
    select the second node as a candidate node when a second score included in the second candidate message is greater than the first score; and
    select the candidate node as a master node if no candidate message or master message is received by the communication interface during a third predetermined duration.

5. The system of claim 4, wherein, when a third candidate message representing a proposal by a third node of the plurality of computing nodes to act as a master node is received during the third predetermined duration, the processor is further programmed to:
    compare a third score included in the third candidate message to the second score; and
    extend the third predetermined duration when the third score is greater than the second suitability score.

6. The system of claim 1, wherein the communication interface is further configured to receive a first master message indicating that a second node of the plurality of computing nodes is acting as a master node, and the processor is further configured to:
    compare the first score to a second score included in the first master message; and
    when the first score is greater than the second score, transmit a second master message indicating that the first node is acting as a master node.

7. The system of claim 6, wherein, when the first score is not greater than the second score, the processor is further programmed to select the second node as a master node.

8. The system of claim 1, wherein the processor is further programmed to disregard a message received via the communication interface when the message is associated with a master selection algorithm that is not identical to a master selection algorithm associated with the first node.

9. A method comprising:
    determining by a first node of a plurality of computing nodes a suitability value that represents a suitability of the first node to act as a master node;
    transmitting by the first node a candidate message representing a proposal by the first node to act as a master node and including a score associated with the first node and a selection timeout value, wherein the score includes the suitability value and the selection timeout value is set to a predetermined duration;
    operating the first node as a master node if the first node does not receive, within the predetermined duration, a master message indicating that another computing node is acting as a master node or a candidate message that includes a score greater than the score associated with the first node;
    selecting a second node of the plurality of nodes as a candidate node if the first node receives, within the predetermined duration, a master message indicating that the second node is acting as a master node; and
    selecting the candidate node as a master node if the first node can successfully connect to the candidate node as a subordinate node.

10. The method of claim 9, wherein the candidate message is a first candidate message including a first score, the method further comprising:
    receiving by the first node a second candidate message including a second score, wherein the second score includes a suitability value representing a suitability of a third node of the plurality of computing nodes to act as a master node; and selecting the third node as a master node by the first node when the suitability value of the second score is greater than the suitability value of the first score and a master message indicating that the third node is acting as a master node is received by the first node.

11. The method of claim 10, wherein the first score further includes an identifier associated with the first node, and the second score further includes an identifier associated with the third node, the method further comprising:
  comparing the identifier associated with the third node to the identifier associated with the first node when the suitability value of the second score is equal to the suitability value of the first score; and
  selecting the third node as a master node by the first node when the identifier associated with the third node is greater than the identifier associated with the first node, and a master message indicating that the third node is acting as a master node is received by the first node.

12. The method of claim 9, wherein operating the first node as a master node comprises transmitting by the first node a master message indicating that the first node is acting as a master node.

13. The method of claim 12, wherein the master message is a first master message, the method further comprising:
  repeatedly transmitting the first master message;
  receiving from a third node of the plurality of computing nodes a second master message indicating that the third node is acting as a master node, wherein the second master message includes a score that is greater than the score associated with the first node; and
  terminating the repeated transmission of the first master message and selecting the third node as a master node based on determining that the third node is a valid master node.

14. The method of claim 9, further comprising determining the suitability value by the first node based on a performance metric associated with the first node.

15. The method of claim 1, further comprising determining the suitability value by the first node based on a quantity of data stores to which the first node is connected, wherein the data stores include virtual disk files.

16. One or more non-transitory computer-readable storage media having computer-executable components comprising:
  a scoring component that when executed by at least one processor causes the processor to determine a first suitability value representing a suitability of a first computing device to act as a master node with respect to a plurality of computing devices; and
  a master selection component that when executed by at least one processor causes the processor to:
    receive a first candidate message representing a proposal by a second computing device of the plurality of computing devices to act as a master computing device, wherein the first candidate message includes a second suitability value associated with the second computing device;
    select the second computing device as a candidate computing device when the second suitability value is greater than the first suitability value;
    receive a second candidate message representing a proposal by a third computing device of the plurality of computing devices to act as a master computing device, wherein the second candidate message includes a third suitability value associated with the third computing device;
    select the third computing device as the candidate computing device when the third suitability value is greater than the second suitability value; and
    extend a predetermined duration in which the master selection component receives candidate messages when the third suitability value is greater than the second suitability value.

17. The non-transitory computer readable storage media of claim 16, wherein the master selection component further causes the processor to select the candidate computing device as a master computing device when no master message and no candidate message including a suitability value greater than the second suitability value are received during a predetermined duration.

18. The non-transitory computer readable storage media of claim 16, wherein the master selection component further causes the processor to:
  receive during the predetermined duration a master message indicating that a third computing device is acting as a master computing device; and
  select the third computing device as a master computing device.

19. The non-transitory computer readable storage media of claim 16, further comprising a compatibility component that, when executed by at least one processor, causes the processor to disregard a received message when the received message is associated with a master selection algorithm that is not identical to a master selection algorithm associated with the first computing device.

20. The non-transitory computer readable storage media of claim 16, wherein the scoring component causes the processor to create a score including the first suitability value and an identifier associated with the first computing device.

* * * * *